Nov. 5, 1963 J. A. HUMPHREYS 3,109,894

ALARM TRANSMISSION APPARATUS AND SYSTEM

Filed Feb. 1, 1960 5 Sheets-Sheet 1

*INVENTOR.*

JOSEPH A. HUMPHREYS

*BY*

Ezekiel Wolf, Wolf + Greenfield

ATTORNEYS

Nov. 5, 1963 J. A. HUMPHREYS 3,109,894

ALARM TRANSMISSION APPARATUS AND SYSTEM

Filed Feb. 1, 1960 5 Sheets-Sheet 2

*INVENTOR.*
JOSEPH A. HUMPHREYS
*BY*
Ezekiel Wolf, Wolf + Greenfield
ATTORNEYS

ALARM TRANSMISSION APPARATUS AND SYSTEM

Filed Feb. 1, 1960 5 Sheets-Sheet 3

INVENTOR.
JOSEPH A. HUMPHREYS
BY
Ezekiel Wolf, Wolf & Greenfield
ATTORNEYS

ALARM TRANSMISSION APPARATUS AND SYSTEM

*INVENTOR.*
JOSEPH A. HUMPHREYS
*BY*
Ezekiel Wolf, Wolf + Greenfield
ATTORNEYS

Nov. 5, 1963 J. A. HUMPHREYS 3,109,894

ALARM TRANSMISSION APPARATUS AND SYSTEM

Filed Feb. 1, 1960 5 Sheets-Sheet 5

INVENTOR.
JOSEPH A. HUMPHREYS
BY
Ezekiel Wolf, Wolf & Greenfield
ATTORNEYS

United States Patent Office 3,109,894

Patented Nov. 5, 1963

3,109,894

ALARM TRANSMISSION APPARATUS AND SYSTEM

Joseph A. Humphreys, 24 Atlantic Ave., Cohasset, Mass.

Filed Feb. 1, 1960, Ser. No. 5,717
9 Claims. (Cl. 179—5)

The present invention relates to an alarm transmission apparatus and system, particularly adapted for the transmission of an alarm signal actuated by a suitable detector means over presently used telephone networks.

The transmitter of the present invention is designed to convey emergency information produced by the triggering of an internal alarm system in commercial or dwelling properties over telephone lines to an automatically or manually monitored central alarm receiving station.

This apparatus is designed primarily for use as auxiliary apparatus for telephone equipment and may be manufactured, installed and used at low costs permitting a widespread economical use in small dwellings or commercial properties.

When used as a fire alarm transmitter, the apparatus is actuated on detection of a fire by the detecting mechanism which does not form a portion of this invention. A preselected signal is transmitted immediately and accurately, indicating the exact location of the fire to the central headquarters or station independent of the telephonic activities of any individuals in the locale. The message is transmitted without the possibility of garbled or failure of information. While the transmitter is primarily designed for use and transmittal of fire detection information, it is also useful in connection with transmittal of other types of information. Thus, the transmitter may be used for transmitting information in connection with burglary detection, and equipment failure, as well as for other purposes in which a change of condition can be reduced to an electrical signal capable of actuating the device.

The transmitter of the present invention is designed to meet requirements necessary to transmit emergency messages through a multiplicity of varying communication systems now in use by telephone companies. Such systems include the step-by-step system, the cross-bar system, and the electronic system of telephone communication as well as variable combinations of these systems. The transmitter is, therefore, adapted for use in conjunction with telephone installations in all parts of the country.

The transmitting apparatus of the present invention is securely installed or fixed on the outside wall of a house or other dwelling or building and is connected to a compatible detection system which does not form a portion of this invention. For purposes of describing the present invention, it will be assumed that the detection system is a fire detecting system wherein electrical signals to the transmitter may be induced by the actuation of a thermal-relay upon the occurrence of a fire. Upon such occurrence, the following sequential steps of operation take place in the transmitter. A detecting means including a relay is activated on the closing of the thermal relay in the detection circuit. This actuated relay releases a standby motor which is preferably a manually wound spring actuated motor. The motor starts to move a perforated tape having an audio message recorded on a magnetic strip. Simultaneously, with the actuation of the motor and running of the tape, a crystal pick-up transducer and amplifier in the transmitter is connected across the telephone line by the closing of normally open microswitches attached to the relay. The audio message informs parties who may be on the line to hang up as the line is about to be taken over for emergency transmission. After this message transmission, which might take about five seconds, a slot in the tape engages a mercury switch positioner mechanism. The positioner mechanism is moved from a standby position to a second position. The positioner mechanism carries several mercury switches. When the mechanism is turned to this second position, the audio and pulse code circuits of the transmitter are disconnected from the telephone lines, and the house or extension telephones are disconnected from the telephone lines. It also disconnects the transmitter from further influence by signals in the detection circuit. Normally, these disconnecting actions take a period of approximately two or three seconds. After these disconnecting sequences, the positioner mechanism is advanced to a third position. In this third position, the audio and pulse code circuits of the transmitter are again connected across the line and the relay is operatively sensitive to signals on the telephone line, rather than on the detection circuit. The relay is, thereafter responsive to signals received on the telephone line. If there is no dial tone at this point, the tape stops since the dial tone excites the relay to keep a relay armature stop disengaged from the tape slot. The tape remains stopped until a dial tone returns to the line. This tone is used to reactuate the relay which starts the motor and tape running once again. As the tape continues to move, a pulse switcher is successively actuated by a series of slots in the tape to generate electrical pulse signals. These slots engage the pulse switcher at a rate and in a sequence simulating the dialing of a telephone. Thus, for example, there may be ten successive slots which would simulate the dialing of "operator" in a manual system. The transmitter is designed so that the tape speed and slot spacing corresponds with pulse frequency of the dialing system. As an alternative design, instead of a pulse switcher, frequency tones may be detected by a crystal cartridge pickup or other suitable means.

After the central station has been dialed or signaled over the telephone line by the pulse switcher, the motor and tape are stopped until a motor actuating signal is received from the central station. If the central station is a manual operation, the motor actuating signal will be the voice of the operator. If the central station is an automatic center or specially designated center, the motor actuating signal is a dial tone of selected frequency automatically applied to the telephone line. The voice of the operator is filtered through a suitable filter network to obtain a suitable signal. In either case, the motor actuating signal is applied to the transmitter to actuate the relay and the motor and thereby cause the tape to start moving once more. Stopping tape between transmission of the dialing signal and receipt of the motor actuating signal from the central station conserves on tape requirements. Once the motor starts again, a signal or coded message from the tape is applied across the transmission line giving a coded or audio identification of the location of the transmission unit. Either a pulse code signal or an audio message may be used, or both may be used. The signal may be repeated several times. After the signal has been repeated, slots in the tape may allow the positioner to return to its first position. This reconnects the telephone into the house line and reconnects the detector system to the relay. An alternative return can be utilized whereby the positioner returns to the second position to permit transmission at different signals to different stations as a double check.

These and other objects and advantages of the present invention will be more clearly understood when considered in conjunction with the accompanying drawings of an embodiment of the invention in which.

Figure 4:
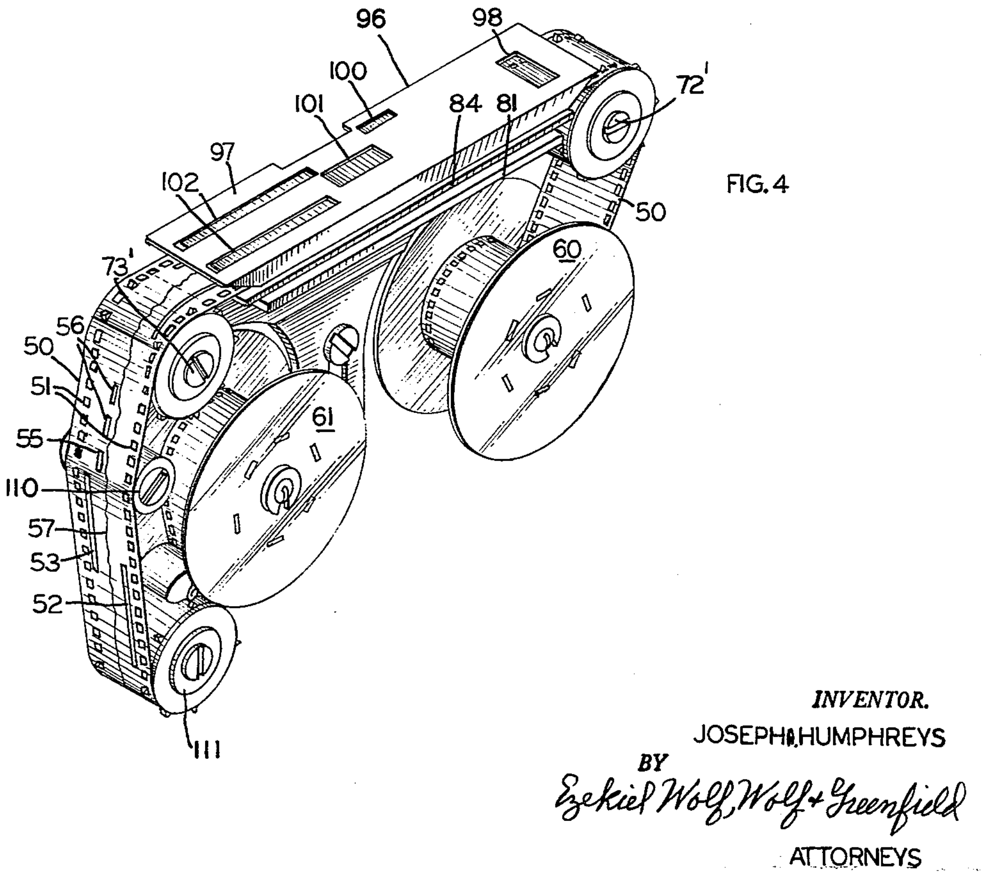
FIG. 4 is a perspective view of the tape feed and control mechanism.
Figures 5, 6, 7, 8:
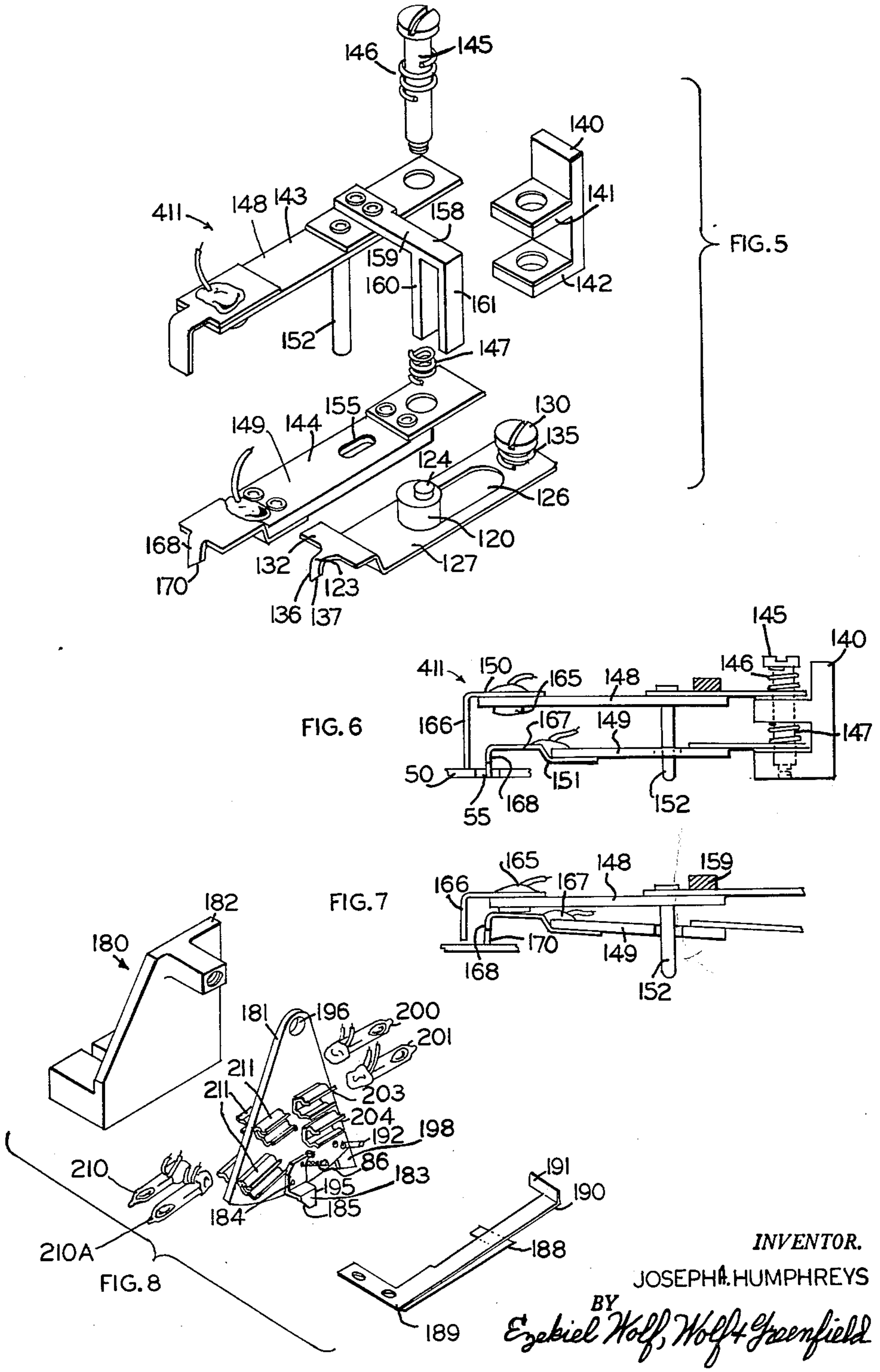
FIG. 5 is an exploded view of the pulse switch assembly.
Figure 9:
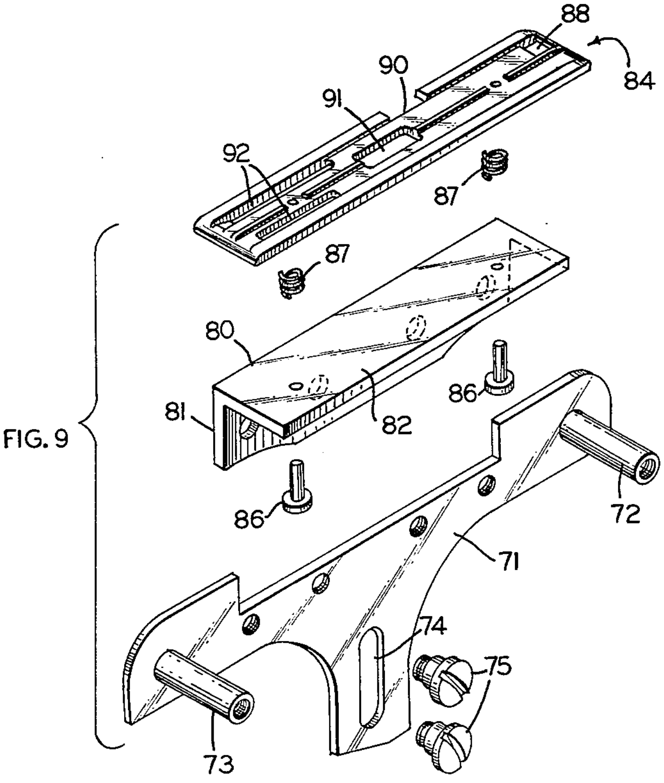
Figure 10:
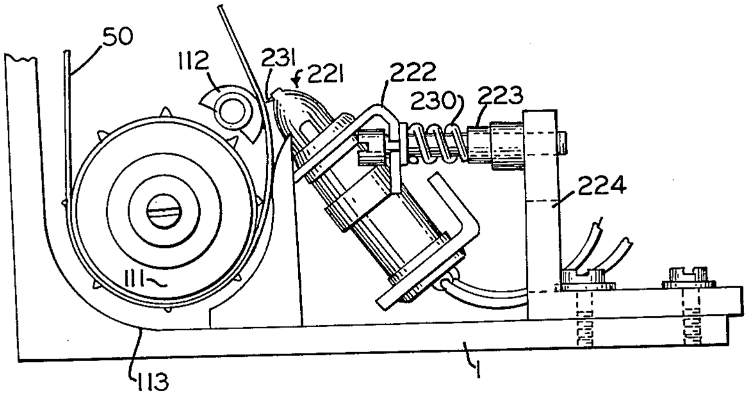
Figure 11:
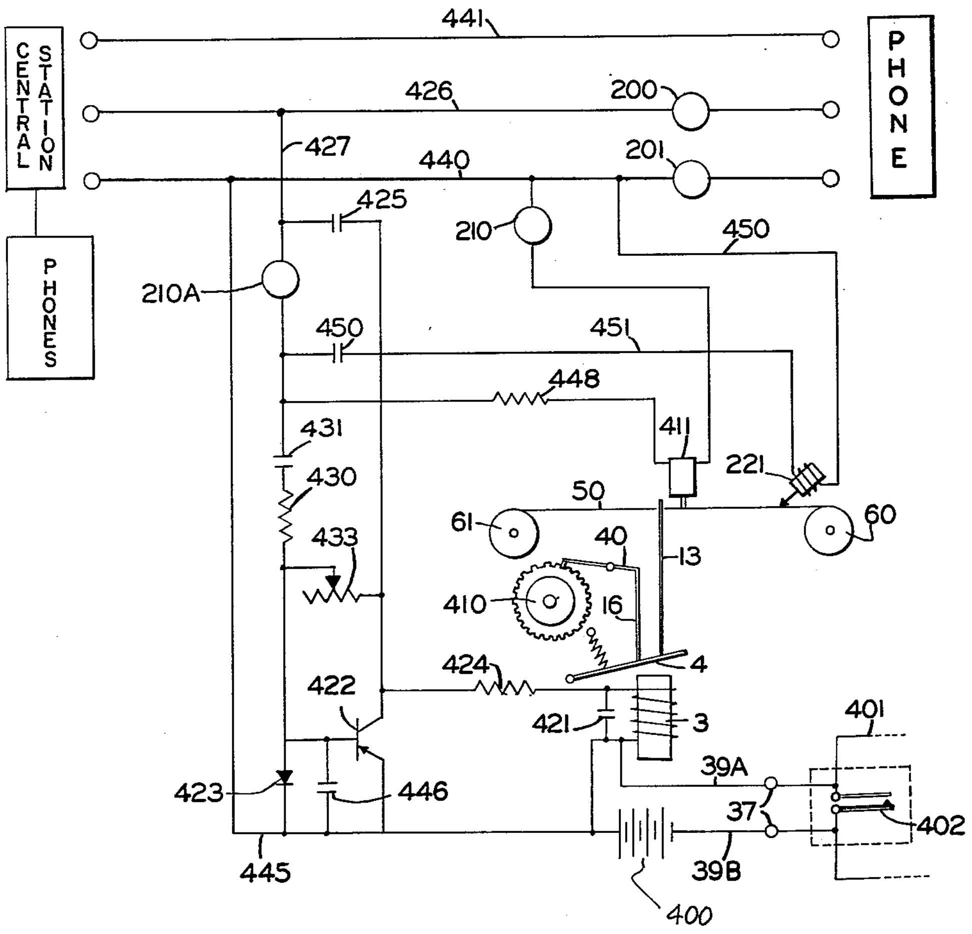

FIG. 6 is a cross sectional view of the pulse switch assembly with contacts open, FIG. 7 is a cross sectional view of the pulse switch assembly with the contacts closed, FIG. 8 is an exploded view of the positioner mechanism, FIG. 9 is an exploded view of a tape guide mechanism shown in part in FIG. 4, FIG. 10 is an elevational view of the crystal pick-up mechanism and, FIG. 11 is a schematic diagram of the electronic circuitry.

The embodiment illustrated in the drawings will be described in conjunction with a system for fire detection. It should be understood that this description is merely illustrative of the inventive concept, and other modifications or uses of the transmitter will become apparent from a consideration of the following description. In addition to the use herein described, in detail, the transmitter may be used in conjunction with burglar alarm detection systems, mechanism position detecting systems, and for other purposes. The unit may also be readily modified to incorporate a dual alarm system, wherein both fire and burglar detection units may be accommodated.

Figure 1:
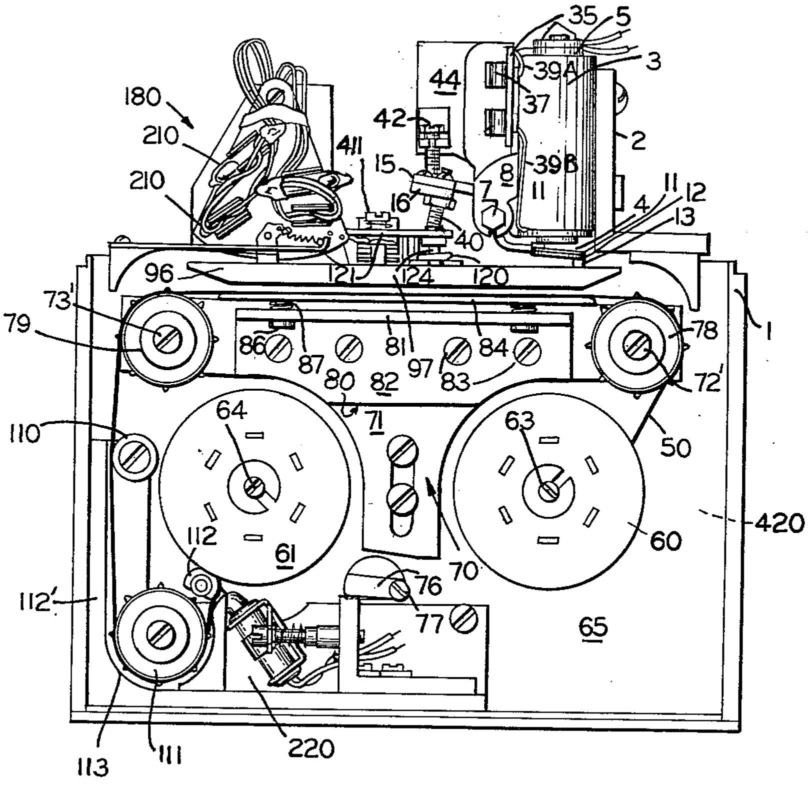
FIG. 1 is a side elevation with a front plate and cover removed.
Figure 3:
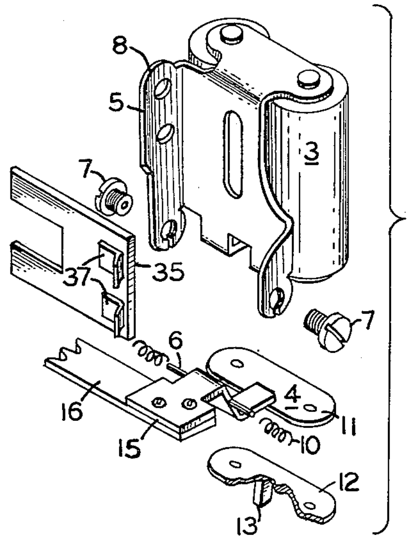
FIG. 3 is an exploded view of the relay mechanism.

Suitably secured to the casing 1 by means of a bracket 2 is a double coil relay 3 (FIGS. 1 and 3). Terminal lugs 37 are secured to the plate 35 with one lug connected through the line 39A (FIG. 11) to the positive terminal of the coils of the relay 3 and the other connected to the negative terminal of a battery 400 through line 39B for actuation of the relay. These lugs 37 are adapted to be connected to the terminals of the outside detection circuit 401, which does not form a part of this invention, so that when an emergency signal is induced in the detection circuit for transmission by closing of a switch such as thermal switch 402 this signal will actuate the relay coils 3.

An armature 4 is secured to the relay bracket 5 by means of supporting pins 6 integral with the armature 4 which in turn are journalled in journalling screws 7. The screws 7 are supported on side wings 8 of the bracket 5 with the pins 6 having springs 10 coaxial therewith. Secured to the bottom plate 11 of the armature 4 by suitable means such as screws or rivets is a tape engaging plate 12 having a downwardly projecting tooth 13 adapted to engage slots in a tape running thereunder. The armature 4 is formed with an offset platform 15 having a transversely extending arm 16 secured to the lower side thereof.

Figure 2:
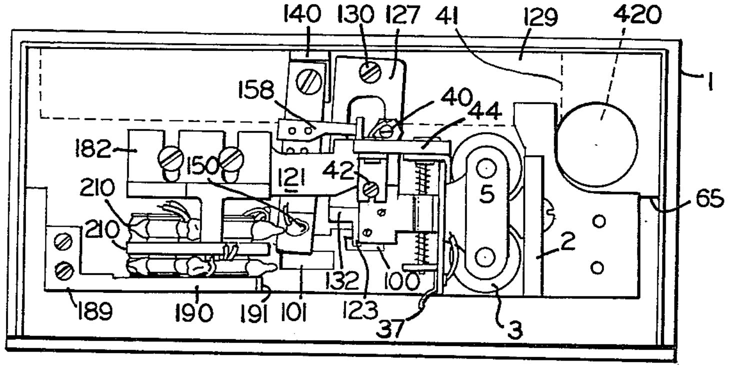
FIG. 2 is a top plan view with the front and cover removed.

The transversely extending arm 16 has secured to it, as illustrated in FIGS. 1 and 11 means for actuating a motor 410 which may comprise a leg 40 which when depressed with the closing of the relay 3, causes operation of the actuating motor 410. The actuating motor may be of any conventional type suitable for uniform rotary drive for a prolonged period of at least two or three minutes. A suitable motor is a manual wind-up type of motor, conventionally used in motion picture cameras. The motor is located within the casing 1 in an area generally located by the dotted line 41 (FIG. 2). If desired, a limiting lug 42 may be secured to the side wings 8 of the relay bracket 5 through an intermediate support 44 for adjustably limiting the rotational movement of the armature 4 (not shown in FIG. 3).

The tape feed and control mechanism illustrated in FIGS. 1 and 4 carries a tape 50. This tape may vary in width or length, depending upon the particular requirements of the transmitter. An 8 mm. size is quite satisfactory for most purposes. A wider tape can be used in a modified form of the invention if dual pulse signals are desirable for transmission of these pulse signals from separate detection systems to different alarm headquarters. A wider tape for dual transmission is particularly useful where the transmitter is used for both fire and burglary alarm transmission. The tape is provided with several different types of slots, each on different tracks, in addition to the motor drive sprocket holes 51, located on either side of the tape. These include a track having outer switch base slots 52 adapted to engage the outer leg of the positioner mechanism (hereafter described) to move the positioner mechanism from its standby position to a second position. A second track has inner switch base slots 53 adapted to move the positioner mechanism from the second-mentioned position to a third mentioned position on engagement with an inner leg of the positioner mechanism (hereafter described). A third track carries slots 55 adapted to be engaged by the tooth 13 (FIG. 3) to cause rotation of the armature 4 which, in turn, causes the motor to shut off, and the tape to stop. A fourth track has a series of pulse switch slots 56 adapted to cause transmission of a pulsing signal code similar to a dialing on the telephone system, whereby a central station may be signalled. The pulse switch slots may be also used for transmission of a coded signal if desired. This additional use of the pulse switch slots may be auxiliary or alternative to a sound track 57 formed on the back of the tape which sound track is used for transmission of audio signals.

The tape runs between the let-off reel 60 and the take-up reel 61. The take-up reel 61 is geared to the drive motor by suitable gearing means while the let-up reel 60 is free running. Shafts 63 and 64 (FIG. 1) supported on the inner wall 65 of the casing 1 support the reels 60 and 61 respectively. Also supported on the inner wall 65 is a tape guide assembly generally indicated at 70 through which the tape 50 moves. This assembly includes a base plate 71 (FIG. 9) having generally a T-shape with fixed idler spindles 72 and 73 projecting normally from the ends of the cross member of the T shape. The base is formed with an elongated slot 74 through which the retaining screws 75 project. These screws slideably secure the base 71 to the inner wall 65 permitting vertical movement of the base 71. This adjustable movement is necessary for insertion of the tape in the tape guide assembly. In FIG. 1 the tape guide assembly is shown with the base 71 in its down position for insertion or removal of the tape. The base is secured in its up or operative position by clockwise rotation of the locking member 76 which is pivotally secured to the inner wall 65 by screws 77. Sprocket idler wheels 78 and 79 are rotated on spindles 72′ and 73′ respectively. An adjustable pressure plate base 80 having an angular cross section with legs 81 and 82 is secured to the base 71 by screws 83 (FIG. 1). A pressure plate lower guide 84 is positioned parallel to and secured in spaced relation with leg 82. This pressure plate lower guide 84 is secured in spaced relation from the base 80 by a pair of shouldered rivets 86 projecting upwardly through the leg 82 and into holes in the lower guide 84 (FIG. 9). Expansion springs 87 coaxial with the rivets 86 tension the guide 84 upwardly. The rivets are secured at their upper end to the guide and are slideable through the openings in the leg 82. This guide 84 is formed with a series of slots. Stop release slot 88 is aligned with tooth 13 (FIG. 1) and is adapted to receive it. A sprocket arm slot 90 is adapted to be aligned with the holes 51 in the tape 50 so that a sprocket arm projecting therethrough can operatively engage the tape. A pulser slot 91, adapted to receive a pulser arm for engagement with the pulse switch slot 55, is centrally formed in the guide 84. In addition, elongated switch base slots 92 are formed to receive the inner and outer switch base legs on the positioner mechanism (hereafter described) which engage the slots 52 and 53 in the tape. Fixed above the lower guide 84 is the upper guide 96 (FIG. 4). This guide 96 has an angular cross section with one leg 97 lying in spaced parallel relation with the lower guide 84 and the other leg secured by suitable means not shown to the inner wall 65 (FIG. 1). The leg 97 of the guide 86 is formed with openings or slots 98, 100, 101 and 102 which correspond and are aligned respectively with holes or slots 88, 90, 91 and 92 in the lower guide 84.

The tape 50 is fed from the let-off reel 60, over idler wheel 72, between lower guide 84 and the leg 97 of the upper guide, over idler wheel 79, past the small idler guide 110 rotatably secured to the inner wall 65, down and around the sprocketed idler wheel 111, journalled to the inner wall 65, around the fixed backing spindle 112, and onto the take-up reel 61. A suitable L-shaped auxiliary frame 112' may be used as an intermediate support for the guide 110 and sprocket 111 and to provide a curved guiding surface 113 for the tape as it passes about the sprocket wheel 111. This arrangement of the tape, feed and control mechanism assures an even and uniform movement of the tape between the tape guide members so that the various slots formed in the tape will be properly aligned with the slots in the upper and lower guides.

The tape 50 is advanced at a uniform rate of speed through operation of the motor. The motor is operatively connected to a vertically extending drive shaft 124 (FIGS. 1 and 5) which is journaled at its upper end for rotation in the support 121 (FIGS. 1 and 2). The drive shaft has a cam 120 fixed to it by suitable means. This cam 120 engages the slot 126 of the stepper 127 (FIG. 5). The stepper 127 (FIGS. 2 and 5) is pivotally secured to an upper intermediate horizontal wall 129 of the casing 1 by the screw 130. An off-set portion 132 (FIG. 5) at the other end of the stepper 127 terminates in a downwardly extending stepper contact finger 123. This finger 123 projects through slot 100 (FIG. 4) in the upper guide 96 and is adapted to engage slots 51 on one side of the tape. Screw 130 freely passes through the stepper 127 with the coaxial spring 135 tensioning the stepper toward wall 129. On rotation of the cam 120 the forward edge 136 of the finger 123 engages a slot 51 thereby moving the tape forward. On continued rotation of the cam 120 the stepper moves rearwardly until the bevelled edge 137 of the finger 123 causes the stepper 127 to ride upwardly out of the slot 51, against the tension of spring 135 and then into the next rearward adjacent slot 51. Thus the rotation of the cam 120 causes a stepping motion of the stepper 127 and an intermittent advancement of the tape 50.

A contact is made with the central station by means of a coded pulse signal effected through the pulse switch 411 illustrated in FIGS. 1, 5, 6 and 7. This pulse switch assembly is designed to produce a pulsing signal similar to the signal used in the dial telephone systems. In this arrangement a bracket 140 is secured by suitable means to the rear wall of the casing 1. This bracket has two inwardly extending parallel flanges 141 and 142 which support respectively the upper pulse switch contact arm 143 and the lower pulse switch contact arm 144. The arms 143 and 144 are secured to the flanges by a screw 145 and are tensioned against the upper surfaces of these flanges 141 and 142 by means of the springs 146 and 147 respectively. Each arm is provided with an intermediate insulating portion 148 and 149 to electrically insulate the contact ends 150 and 151 respectively. The arms 143 and 144 are keyed together for uniform rotational movement by the coupling pin 152 which is fixed at its upper end to the arm 143 and vertically slideably engages a hole in the lower arm 144 through the slot 155. A yoke 158 has a transverse arm 159 suitably secured to the upper arm 143. Two parallel depending legs 160 and 161 project through and straddle the wall adjacent the slot 126 on the stepper 127, thereby operatively coupling the pulse switch assembly to the stepper 127. The contact end 150 has a contact terminal 165 and a depending flange 166 which rides on the upper surface of the tape 50. The contact end 151 also has a contact 167 and a depending flange 168 which rides alternately on top of the tape 50 and in the slots 55. Depending flange 168 has a bevelled trailing edge 170 (FIG. 5) to permit the flange to ride upwardly and out of the slots 55 on the return movement of the lower arm 144.

In the operation of the pulse switch assembly, the rotation of cam 120, in addition to actuating the stepper 127 will actuate the pulse switch assembly through the interengagement of the yoke 158 and the stepper 127. The stepper 127 oscillates over a limited arc about the axis defined by the screw 130. Simultaneously, the upper and lower contact arms 143 and 144 which are keyed together by a pin 52 oscillate about an arc having the pin 145 at its center at the same time the tape 50 is driven beneath the arms 143 and 144. When there are no slots 55 beneath the arms 143 and 144 the contacts 165 and 166 are closed as illustrated in FIG. 7. Arm 143 is raised somewhat against the tension of spring 146 thereby assuring a positive contact between the two contacts 167 and 165. When a slot 55 appears, the lower arm 144 drops into the slot as illustrated in FIG. 6. The upper arm 143 drops until the lower edge of its flange 166 engages the upper surface of the tape 50. The contacts are thereby opened and the pulsing circuit is opened. As the slot continues to advance with the movement of the tape, and the cam 120 starts the return movement of the stepper 127 the bevelled edge 170 will cause the lower arm 144 to rise out of the slot 55 and back into the position illustrated in FIG. 7. This operation of the pulse switch assembly causes preselected intermittent interruptions of the dial pulse circuit in the telephone, thereby producing the desired pulsing which simulates pulsing caused by conventional manual dialing techniques.

The switch positioner 180 (FIGS. 1 and 8) has a pivotable base 181 pivotally mounted on a bracket 182 in turn suitably mounted on the casing adjacent the relay assembly and over the tape guide assembly. This base 181 is adapted to be pivoted by movement of the tape 50. It may be positioned one of three positions with a normal or standby position illustrated in FIG. 1. The normal or standby position is the position in which the unit is set before actuation. The tape remains in this standby position during an initial period of actuation in which an audio message is transmitted to people on the line informing them that the use of the line is about to be preempted. After the audio line clearing message has been completed, the base 181 is in a standby position. In this standby position, the pawl 183 pivotally secured by pin 184 to the lower portion of the base 181 rides with its bevelled edge 185 on top of the tape 50. In this position, the pawl 183 is rotated about 30° about the pin 184 against the tension of the spring 186. A leaf spring 188 suitably secured at its end 189 to the casing engages the pawl 183 to prevent premature clockwise movement. The spring 188 is held in engaging position and prevented against upward movement by the fixed arm 190, also secured to the casing. This arm 190 is provided with an inwardly extending end lip 191. The lip 191 engages the pin 192 projecting normally from the surface of the base 181 to prevent excessive counter clockwise rotation of the base about the bracket 182, which might interfere with the operation of the relay assembly. At the completion of the audio signal, an elongated slot 52 (FIG. 4) moves under the pawl 183 permitting spring 186 to rotate the pawl to a vertical position. As the tape advances, the rear edge of elongated slot 52 engages the edge 195 of the pawl causing a rotation of the base 180 about its axis 196 to a point at which the lower portion of the pawl 183 rides on the surface of the tape. Simultaneously, a fixed projection 198 secured to the other side of the base 181 is pivoted into another elongated slot 53 in the tape (FIG. 4). In this second position the switch assembly is in its disconnect position in which the telephone hand sets the audio pickup 220 and pulse switch 411 are disconnected from the telephone line. This occurs when mercury switches 200 and 201 carried on the base 181 move from their normally closed to a normally open position (FIG. 11). These switches are mounted respectively in the brackets 203 and 204. This action serves to disconnect all lines and brings back or continues a dial tone. The end of the slot 53 engages the projection 198 and causes a further clockwise rotation of the base 181. This causes the base 181 to rotate to a third or reconnect position for transmission of the signal. At this point the dial tone has normally returned to the line. This tone holds the relay armature step or teeth 13 out of the tape slots. If there is no dial tone the tooth 13 will engage and stop the tape until a tone returns. In this reconnect position, the fixed projection 198 rides on the top of the solid tape 50. The base 181 may, if desired, be tensioned in a counter clockwise direction by means of a spring (not shown). In this third or reconnect position the relay mechanism circuit, while closed remains inoperational because of an insufficient signal. The sequence of the relay mechanism operation will be explained in connection with FIG. 11. The house telephone has been disconnected until completion of the alarm transmission. The alarm is transmitted after the closing of circuits through mercury switches 210, and 210A supported in brackets 211. In its reconnect position, the running tape causes the pulsing of the dial tone, in a manner previously described, to signal the central station. After the central station has been signaled, by the pulsing or dialing action, the tape is stopped by engagement of the teeth 13 as previously described. The tape will remain stopped until receipt of a dial tone signal transmitted by the headquarters automatic system or receipt of an audio acknowledgment in the voice frequency range. Filters may be used through the electronic network of the transmitter as hereafter described, to convert these signals to an energizing signal for the relay. This causes the relay to again actuate and the tape to move once again. The tape then passes a series of the holes 55 under the pulsing switch to cause transmission of a coded pulse message. Alternately, or as an auxiliary message transmission, an audio message may be transmitted by means of the audio mechanism hereafter described. These signals identify the exact location from which the alarm signal originated. After termination of the signal, the base 181 is returned to the standby position when pairs of slots pass under the pawl 183 and projection 198. In this position, all circuits are returned to their original standby position. This operation reconnects the unit for possible further emergency use. If desired, the alarm sequences can be repeated to another or verifying headquarters by returning the base 181 one step to the disconnect position. This may be accomplished by using a single slot for projection 198 which allows a partial return only. This partial return to the disconnect position returns the dial tone in the line. This dial tone may then be pulsed with new pulses in a different grouping of slots 55 to call a second headquarters number to repeat the original or a different message.

Audio transmission is effected through a crystal sound pickup assembly generally illustrated at 220 (FIGS. 1 and 10). In this arrangement, the tape 50 passes between the idler 112 and the crystal cartridge 221. This cartridge 221 may be of conventional design and is supported by a yoke 222 mounted on a pair of threaded shafts 223 in turn secured to the bracket 224. Bracket 224 is fixed to the casing 1. The yoke 222 is tensioned by springs 230 to cause the needle 31 to bear against the tape 50. The tape 50 is suitably embossed on its underside with a sound track for exciting the crystal cartridge.

FIG. 11 illustrates schematically, the circuit of the present invention. In this figure, like numbers refer to like components of the mechanism previously described. In addition to the components previously mentioned, there is provided a battery 400 which is preferably an 8 volt, D.C. mercury cell. This battery is located in the housing in a position indicated at 420 (FIGS. 1 and 2). This battery has its negative terminal connected to the terminal lug 37 and its positive terminal connected to one terminal of a capacitor 421 and the emitter of the transistor 422. The capacitor 421 has its other terminal connected to the junction of the resistor 424 and one terminal of the coil of relay 3. The other terminal of resistor 424 is connected through a capacitor 425 to line 427 and telephone line 426. The collector of transistor 422 is also connected through capacitor 425 to line 427. The base of the transistor 422 is connected to line 427 through a series arrangement of a resistor 430 and capacitor 431. A potentiometer 433 is connected between the collector terminal of transistor 422 and resistor 430. The line 427 is connected to line 426 which is one of the telephone lines connecting the central switchboard and the subscriber's phone. The other lines connecting the central switchboard are lines 440 and 441, line 441 being a ground line. Connected in series with lines 426 and 440 respectively, are the microswitches 200 and 201 respectively. Connected in series with line 427 between the junctions of capacitors 425 and 431 is the microswitch 210A. A diode 423 and capacitor 446 are connected in parallel between the transistor base and line 445.

Pulse switch 411 is connected in series with microswitch 210, 210A and resistor 448 across lines 426 and 440 through line 427. Audio pickup 221 is connected in series with capacitor 450 and microswitch 210*a*, line 427 across lines 426 and 440.

The operation of this circuit may be described in five operational conditions. In the first operational condition which occurs when the unit is in its standby condition, the thermoswitch 402 of the detection circuit 401 is open. The battery 400 is thereby open circuited and no signal appears on the coil of relay 3. Under these conditions, mercury switches 200 and 201 are normally closed while mercury switches 210 and 210A are opened (the standby condition of positioner 181). Thus, the subscriber's phone is connected directly to the central switchboard through lines 427 and 440 and the remainder of the alarm circuit is disconnected. The armature of relay 4 is not energized, and the stop 13 holds the tape in its stopped position. The fully wound spring-driven motor 410 is also inoperative because of engagement of the leg 40.

In the second operational condition, the alarm unit is actuated upon the occurrence of a fire. Under these conditions, the thermal switch 402 closes. This sends a momentary high current pulse from the battery 400 through the coil of relay 3 and the electrolytic capacitor 421. This causes the armature 4 of the relay to move, in turn moving the tooth 13 from its engagement with the tape 50. The motor also begins to operate when the leg 40 is disengaged from it. After this momentary high D.C. pulse, there is insufficient current in the coil to continue to actuate the armature 4. The tooth then presses downwardly against the tape, but does not stop it since there is no hole directly underneath it with which the tooth can be engaged.

The potentiometer 433 may be utilized for adjusting the current flow from the lines 426, 427 through the transistor collector-emitter circuit so that insufficient current passes through the circuit to energize the coil until a positive signal is received from the central switchboard as hereafter described.

When the tape 50 begins to move, a magnetic phonograph pickup 221 riding on the tape message groove transmits an audio message through the battery energized transistor to all parties on the telephone line. The signal from the pickup 221 is completed through line 440, and 445 to the base of transistor 422 and on the other side through line 451, capacitor 431 and resistor 430 to the transistor base. The signal amplified through the collector and applied through capacitor 425 to line 426. After the parties on the line have heard the audio message and sufficient time has passed to allow the parties to hang up, a hole in the tape again engages the pawl 183 and another hole causes the positioner mechanism to move to its second position. This, in turn, closes the mercury switches 210 and 210A and opens the mercury switches 200 and 201 which are carried on the base 181. The subscriber's phone is disconnected and the tape is braked if there is no dial tone, and awaits release once again by a subsequent dial tone.

In the third step, after the telephone lines have been disconnected from the subscriber's phone, a dial tone appears. This dial tone is coupled from line 426 through the capacitor 431 to the junction of the transistor base and diode anode. The dial tone current is rectified by the diode and negative bias presented to the PNP transistor. Current is then allowed to flow from the negative terminal of the battery through the relay coil and back through the transistor collector-emitter elements to the positive terminal of the battery. The armature of the relay is thereby actuated as there is sufficient current passing through the coil. When the armature is actuated, the tooth 13 once again disengages the tape 50 and the motor is released. When the tape again moves the positioner mechanism is pivoted to its third position. This occurs when the tape rotates the base 181 by pushing against the fixed projection 198. In this third position of the base 181, the mercury switches 210 and 210*a* are closed and the switches 200 and 201 remain open. In this position, the pulse switch 411 is connected across the lines 426—440, in series with the resistor 448 and switches 210A and 210. The tape continues to move and actuates this pulse switch 411 by engagement with a series of coded slots. The engagement of the coded slots with the pulse switch 411 causes a coded signal to be transmitted to the central telephone relay circuit over lines 426, 440. At the conclusion of the coded transmission which indicates the particular source of the signal, tape slot engages the tooth 13 once again. In this position, the tape slot stops and the unit awaits a command signal from the central switchboard. The central switchboard either by automatic or oral means, provides a signal which actuates the relay 3 once more. If an oral signal is used, the signal may be passed through a filter circuit (not shown) in order to obtain a desired actuating signal in the relay 3.

In the fourth operational condition, the command signal generated by the central station, is coupled from line 426 to the transistor relay amplifier 422, through the line 427. This signal again actuates the relay coil 3. This, in turn, causes the tape to move once more and the pulse switch to transmit to the central station, particular coded information which may again specify the signal location.

In the final operational condition, the positioner mechanism is returned to its original position by providing slots of sufficient length to permit the positioner base 181 to move in a counterclockwise direction as viewed in FIG. 8 to its second position. Under these conditions, the device is ready to cycle once more from the alarm or second operational condition. If desired, the sequential signals thus may be used to transmit signals to other central stations.

In order to return to the original operational condition, or standby condition, the device must be reset and the tape rewound.

I claim:

1. An apparatus for use in a telephonic system for message signal transmission over telephone lines to a central station on occurrence of an alarm signal in a local alarm system comprising telephones, telephone lines connecting said telephones to said central station, a local alarm system for generating alarm signals when actuated, detecting means for receiving an alarm signal from said alarm system, audio message transmitting means responsive to signals in said detecting means for transmitting audio messages to telephones on said telephone lines upon receipt of a signal from said alarm system, means for generating dial tones in said telephones through said telephone lines from said central station, disconnecting means operatively associated with said message transmitting means for disconnecting telephones and said message transmitting means from said lines whereby telephone dial tones may be established on said lines, contacting signal means for emitting an electrical signal over said lines to signal the said central station upon connection of said contacting signal means to said telephone lines and receipt of said dial tones, and means responsive to said dial tone for connecting said contacting signal means to said telephone line.

2. An apparatus for use in a telephonic system for message signal transmission over telephone lines to a central station on occurrence of an alarm signal in a local alarm system comprising telephones, telephone lines connecting said telephones to said central station, a local alarm system for generating alarm signals when actuated, detecting means for receiving an alarm signal from said alarm system, audio message transmitting means responsive to signals in said detecting means for transmitting audio messages to telephones in said telephone lines after receipt of a signal from said alarm system, means for generating dial tones in said telephones through said telephone lines from said central station, disconnecting means operatively associated with said message transmitting means for disconnecting telephones and said message transmitting means from said lines whereby telephone dial tones may be established on said lines, contacting signal means for emitting an electrical signal over said lines to signal said central station upon connection of said contacting signal means to said lines, means responsive to said dial tone for connecting said contacting signal means to said telephone lines, means for disconnecting said contacting signal means from said telephone lines after said electrical signal is emitted until a recognition response is received from said central station means associated with said central station for generating a recognition response signal when said central station receives said electrical signal and means for generating an identification signal through said telephone lines indicating the location of said apparatus, and means for thereafter connecting identification signal means to said telephone lines.

3. An apparatus for use in a telephonic system for message signal transmission over telephone lines to a central station on occurrence of an alarm signal in a local alarm system comprising telephones, telephone lines connecting said telephones to said central station, a local alarm system for generating alarm signals when actuated, detecting means for receiving an alarm signal from said alarm system and for actuating a second means, said second means responsive to said first mentioned means for clearing said telephone lines for message transmission to said central station, an information bearing tape, motor means for advancing said tape operatively associated with said local alarm system, transducer means for detecting an information signal as said tape is advanced and applying it to said telephone lines to signal said central station, means for detecting when said lines are clear, means operatively associated with said last mentioned means for actuating said motor means when said lines are clear for a selected time interval and for thereafter reactuating said motor means in response to a recognition signal from said central station and means associated with said central station for generating recognition response signals when said central station receives said signal from said transducer means whereby said motor means may be reactivated.

4. A device as set forth in claim 3 wherein said tape has an audio message track, and audio transducer means for applying said audio message to said lines before said lines are cleared for message transmission to said central station.

5. A device as set forth in claim 3 wherein said tape has a series of perforations and said transducer means includes a pulse switch adapted to engage and thereby be actuated by said perforations to signal said central station through said telephone lines.

6. An apparatus for use in a telephone system for message signal transmission over telephone lines to a central station on occurrence of an alarm signal in a local alarm system comprising telephones, telephone lines connecting said telephones to said central station, a local alarm system for generating alarm signals when actuated, detecting means including a relay for receiving an alarm signal from said alarm system and for actuating clearing means and a motor means on receipt of said signal, said motor means operatively controlled by said relay, means including an information bearing tape adapted to be advanced on operation of said motor, clearing means responsive to a signal in said detecting means for clearing said telephone lines, and actuating said motor means for a selected time interval, transducer means for transducing information contained on said tape and applying as an electrical signal across said telephone lines, during said time interval to signal said central station, means responsive to a recognition signal from said central station for reactuating said motor means for subsequent information transmission and means associated with said central station for generating recognition signals when said central station receives said electrical signal from said transducer means whereby said motor means may be reactuated.

7. A device as set forth in claim 6 wherein said relay is connected to said telephone lines and is responsive to signals from said central station for reactuation of said motor means.

8. A device as set forth in claim 6 wherein said means for clearing said telephone lines includes switch means in said lines adapted when open to disengage telephones on said lines and a pivotable positioner mechanism having members engageable by portions of said moving tape, said portions positioned on said tape to pivot said positioner mechanism to different positions at selected intervals of advancement of said tape, said positioner mechanism adapted to control said switches on pivoting.

9. A device as set forth in claim 8 wherein said positioner mechanism carries additional switches adapted to engage and disengage said apparatus from said line with said additional switches operatively controlled on pivotal movement of said positioner mechanism.

References Cited in the file of this patent

UNITED STATES PATENTS 2,555,714 Talbot ---------------- June 5, 1951